United States Patent
Boenapalli et al.

(10) Patent No.: US 12,417,196 B2
(45) Date of Patent: Sep. 16, 2025

(54) SYSTEMS AND METHODS FOR REDUCING LATENCY AND POWER CONSUMPTION IN A PERIPHERAL COMPONENT INTERCONNECT EXPRESS (PCIe) SYSTEM

(71) Applicant: QUALCOMM INCORPORATED, San Diego, CA (US)

(72) Inventors: Madhu Yashwanth Boenapalli, Hyderabad (IN); Ravindranath Doddi, Hyderabad (IN); Vinod Kumar Kuruma, Jogulamba Gadwal (IN); Surendra Paravada, Hyderabad (IN); Sai Praneeth Sreeram, Anantapur (IN)

(73) Assignee: Qualcomm Incorporated, San Diego, CA (US)

( * ) Notice: Subject to any disclaimer, the term of this patent is extended or adjusted under 35 U.S.C. 154(b) by 238 days.

(21) Appl. No.: 18/337,235

(22) Filed: Jun. 19, 2023

(65) Prior Publication Data

US 2024/0419613 A1    Dec. 19, 2024

(51) Int. Cl.
*G06F 13/16* (2006.01)

(52) U.S. Cl.
CPC .. *G06F 13/1694* (2013.01); *G06F 2213/0026* (2013.01)

(58) Field of Classification Search
CPC .... G06F 1/3296; G06F 1/3253; G06F 1/3237; G06F 13/1694
See application file for complete search history.

(56) References Cited

U.S. PATENT DOCUMENTS

| | | | |
|---|---|---|---|
| 10,712,809 B2 * | 7/2020 | Cherukuri | G06F 1/3287 |
| 2007/0150762 A1 * | 6/2007 | Sharma | G06F 1/3203 |
| | | | 713/300 |
| 2019/0346909 A1 * | 11/2019 | Cherukuri | G06F 1/3287 |
| 2020/0226084 A1 * | 7/2020 | Das Sharma | G06F 13/362 |
| 2021/0042248 A1 * | 2/2021 | Das Sharma | G06F 13/4282 |
| 2022/0116138 A1 * | 4/2022 | Das Sharma | G06F 13/4027 |
| 2024/0248645 A1 * | 7/2024 | Ishiguro | G06F 3/0625 |

OTHER PUBLICATIONS

Related PCT App. Ser. No. PCT/US24/028210, filed on May 7, 2024, entitled, "Systems and Methods for Reducing Latency and Power Consumption in a Peripheral Component Interconnect 1 Express (PCIe) System," International Search Report (ISR) and Written Opinion of International Searching Authority (ISA=EPO), dated Aug. 26, 2024, 11pages.

* cited by examiner

*Primary Examiner* — Phong H Dang
(74) *Attorney, Agent, or Firm* — Smith, Tempel, Blaha LLC

(57) ABSTRACT

A Peripheral Component Interconnect Express (PCIe) system and method achieve reduced power consumption and latency. When the link transitions from an active functional state in which the link has a first configuration of N active lanes to a power-saving state, the number of active lanes is collapsed such that M of the N lanes are maintained in an active power-saving state and P of the N lanes are maintained in an electrically idle state, where M, N and P are positive integers and N>P>M. The reduction in lane width reduces power consumption. Bit values specifying the current link configuration can be saved in a control register and read and compared to bit values contained in a link control register before transitioning back to the active functional state. If the bit values match, the active functional state is resumed directly from the recovery state, thereby reducing latency.

23 Claims, 8 Drawing Sheets

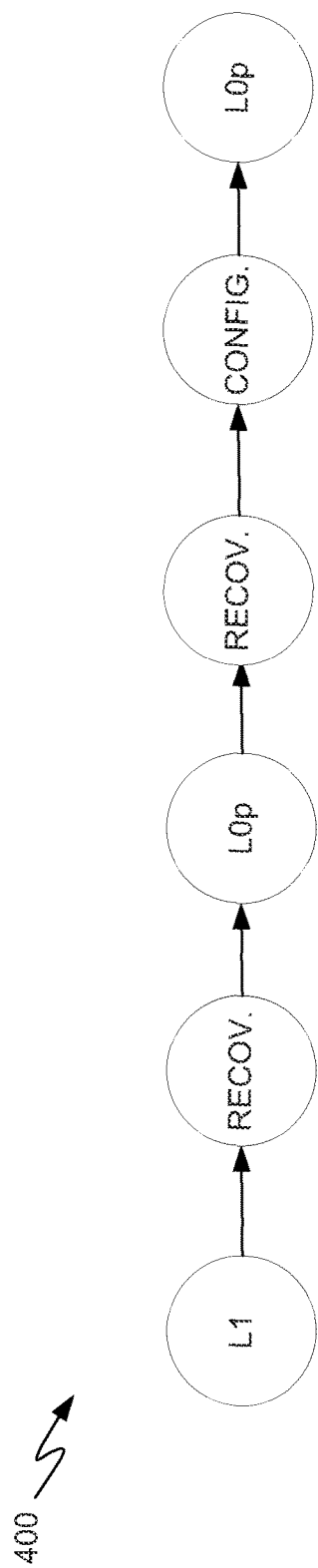
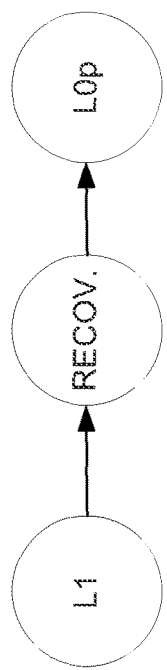
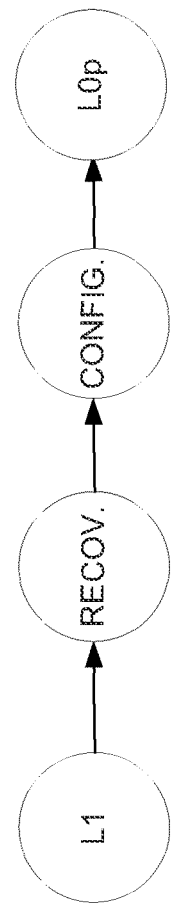
FIG. 4
FIG. 5
FIG. 6

SYSTEMS AND METHODS FOR REDUCING LATENCY AND POWER CONSUMPTION IN A PERIPHERAL COMPONENT INTERCONNECT EXPRESS (PCIe) SYSTEM

DESCRIPTION OF THE RELATED ART

A computing device may include multiple processor-based subsystems. Such a computing device may be, for example, a portable computing device ("PCD"), such as a laptop or palmtop computer, a cellular telephone or smartphone, a portable digital assistant, a portable game console, etc. Still other types of PCDs may be included in automotive and Internet-of-Things ("IT") applications.

Such processor-based subsystems may be included within the same integrated circuit chip or in different chips. A "system-on-a-chip", or "SoC", is an example of one such chip that integrates numerous subsystems to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other subsystems, such as a transceiver or "modem" subsystem that provides wireless connectivity, a memory subsystem, etc.

Many of these subsystems communicate with one another using a standardized packet-based interface technology known as Peripheral Component Interface Express (PCIe). The PCIe 6.0 specification supports 128 Giga transfers per second (GT/s) over a PCIe bus. Components communicate bits in flow control units (FLITs) over one or more lanes of the PCIe bus at various link speeds. The link speeds and the number of lanes that are being used to communicate between the root complex (RC), or host, and the end point (EP) devices, or clients, can by changed by reconfiguring the link between the host and the clients.

In order to achieve scaling of power consumption with bandwidth usage, the PCIe 6.0 specification introduces a new power state called the "L0p" state. The L0p state is the recommended active functional state for FLIT mode of operations. In the L0p state, the configured number of lanes are set to be in the active state while all other lanes are kept in the electrically idle state. In the L0p state, the PCIe system maintains at least one active lane during lane width transitions for carrying traffic and places the other lanes in idle mode to reduce power consumption. In this way, the PCIe 6.0 specification allows power consumption to be scaled to bandwidth usage without completely interrupting traffic flow.

The PCIe 6.0 specification also specifies power saving states, including states L1, L1.1 and L1.2. References made herein to the L1 state should be construed as referring to the L1, L1.1 or L1.2 states. The L1 state is a link state in which no data is being transferred. The link transitions from the L0p state to the L1 state when there is no data to transfer and then transitions back to the L0p state when there is data to be transferred. When the PCIe link transitions from the L0p state to the L1 state, all of the lanes that were active in the L0p state are retained in the L1 state, i.e., voltage and clock signals continue to be provided for the lanes that were active in the previous L0p state. Consequently, even though less power is consumed in the L1 state than in the L0p state, the power consumed in the L1 state is significant.

In addition, if there is a change in configuration with respect to link speed and/or number of lanes when the link transitions from the L1 state back to the L0p state, the path of transition is:

L1 state→recovery state→L0p state→recovery state→configuration state→L0p. In the recovery state, both the transmitter and the receiver are sending and receiving data using the configured link speed and lane number, or link width. The recovery state allows a configured link to change its data rate of operation, reestablish bit lock, symbol lock or block alignment, and perform lane-to-lane de-skewing. The entry into multiple recovery periods when transitioning from the L1 state to the L0p state introduces additional latency in returning to the L0p state.

SUMMARY OF THE DISCLOSURE

Systems, methods, and other examples are disclosed for reducing latency and power consumption in a PCIe system.

An exemplary embodiment of the method comprises:
with a processor of the PCIe system, operating a PCIe link of the PCIe system in a first active functional state, the PCIe link having a first PCIe link configuration in the first active functional state in which N lanes of the PCIe link are electrically active and are used to communicate data between the processor and an EP device over the N lanes; and
with the processor, causing the PCIe link to transition from the first active functional state to a first power-saving state, the PCIe link having a second PCIe link configuration in the first power-saving state in which M lanes of the N lanes are electrically active and P lanes of the N lanes are electrically idle, where M, N and P are positive integers and N>P>M.

An exemplary embodiment of the PCIe system comprises a PCIe bus comprising a plurality of lanes comprising a PCIe link and a processor electrically coupled to the PCIe link. The processor comprises logic configured to operate the PCIe link in at least a first active functional state and in at least a first power-saving state. The PCIe link has a first PCIe link configuration when the PCIe link is being operated in the first active functional state in which N lanes of the PCIe link are electrically active and used to communicate data between the processor and an end point (EP) device over the N lanes. The processor further comprises logic configured to cause the PCIe link to transition from the first active functional state to the first power-saving state. The PCIe link has a second PCIe link configuration in the first power-saving state in which M lanes of the N lanes are electrically active and Planes of the N lanes are electrically idle, where M, N and P are positive integers and N>P>M.

An exemplary embodiment of a computer program for execution by a processor of a PCIe system comprises first set and second sets of computer instructions. The first set of computer instructions is for causing the processor to operate a PCIe link of the PCIe system in a first active functional state. The PCIe link has a first PCIe link configuration in the first active functional state in which N lanes of the PCIe link are electrically active and are used to communicate data between the processor and an EP device. The second set of computer instructions is for causing the processor to transition the PCIe link from the first active functional state to a first power-saving state. The PCIe link has a second PCIe link configuration in the first power-saving state in which M lanes of the N lanes are electrically active and P of the N lanes are electrically idle, where M, N and P are positive integers and N>P>M.

Another exemplary embodiment of the PCIe system comprises a PCIe bus comprising a plurality of lanes comprising a PCIe link. The PCIe system further comprises means for operating the PCIe link in at least a first active functional state and in at least a first power-saving state. The PCIe link has a first PCIe link configuration when the PCIe link is being operated in the first active functional state in which N lanes of the PCIe link are electrically active and used to communicate data between the processor and an EP device over the N lanes. The PCIe system further comprises means for causing the PCIe link to transition from the first active functional state to the first power-saving state. The PCIe link has a second PCIe link configuration in the first power-saving state in which M lanes of the N lanes are electrically active and Planes of the N lanes are electrically idle, where M, N and P are positive integers and N>P>M.

These and other features and advantages will become apparent from the following description, drawings and claims.

BRIEF DESCRIPTION OF THE DRAWINGS

In the Figures, like reference numerals refer to like parts throughout the various views unless otherwise indicated. For reference numerals with letter character designations such as "101$a$" or "101$b$", the letter character designations may differentiate two like parts or elements present in the same Figure. Letter character designations for reference numerals may be omitted when it is intended that a reference numeral to encompass all parts having the same reference numeral in all Figures.

FIG. 4 illustrates a state diagram for the path of transition from the L1 state to the L0p state using the current PCIe 6.0 approach.

FIG. 5 illustrates a state diagram for the path transition from the L1 state to the L0p state using the approach of the present disclosure when no link reconfiguration is needed for the L0p state in accordance with a representative embodiment of the present disclosure.

FIG. 6 illustrates a state diagram for the path transition from the L1 state to the L0p state using the approach of the present disclosure when link reconfiguration is needed for the L0p state in accordance with a representative embodiment of the present disclosure.

DETAILED DESCRIPTION

Figure 1A:
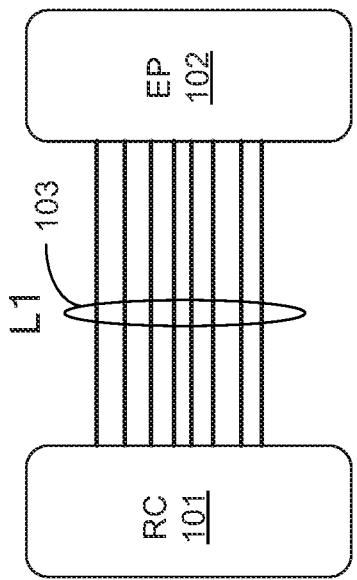
FIGS. 1A and 1B illustrate a block diagram of a PCIe 6.0 link and demonstrate an example of the manner in which a lane configuration used in the L0p state shown in FIG. 1A is retained in the L1 state shown in FIG. 1B after the link transitions from the L0p state to the L1 state in accordance with the current PCIe 6.0 specification.

The present disclosure discloses PCIe systems and methods for reducing power consumption when operating in power-saving states and reduces latency when transitioning from power-saving states to active functional states. Exemplary embodiments of the manner in which a PCIe system can be configured to perform methods for reducing power consumption and latency are discussed below with reference to the figures.

In the following detailed description, for purposes of explanation and not limitation, exemplary, or representative, embodiments disclosing specific details are set forth in order to provide a thorough understanding of an embodiment according to the present teachings. The word "exemplary" is used herein to mean "serving as an example, instance, or illustration." The words "illustrative" or "representative" may be used herein synonymously with "exemplary." Any aspect described herein as "exemplary" is not necessarily to be construed as preferred or advantageous over other aspects. However, it will be apparent to one having ordinary skill in the art and having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory device", as that term is used herein, is intended to denote a non-transitory computer-readable storage medium that is capable of storing computer instructions, or computer code, for execution by one or more processors. References herein to a "memory device" should be interpreted as including one or more memory devices.

A "processor", as that term is used herein encompasses an electronic component that is able to execute a computer program or executable computer instructions. References herein to a computer comprising "a processor" should be interpreted as one or more processors. The processor may for instance be a multi-core processor comprising multiple processing cores, each of which may comprise multiple processing stages of a processing pipeline. A processor may also refer to a collection of processors within a single system or distributed amongst multiple systems.

A computing device may include multiple subsystems, cores or other components. Such a computing device may be, for example, a PCD, such as a laptop or palmtop computer, a cellular telephone or smartphone, a portable digital assistant, a portable game console, an automotive safety system, etc.

Figure 1B:
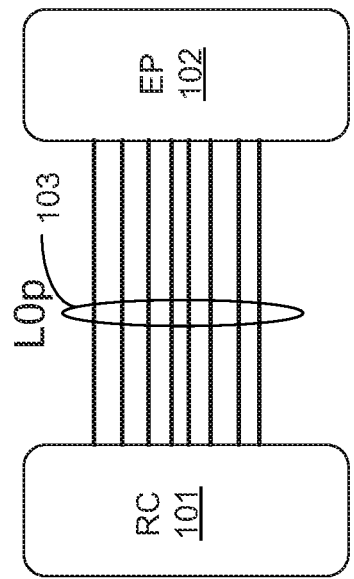

FIGS. 1A and 1B illustrate a block diagram of a PCIe 6.0 link and demonstrate an example of the manner in which a lane configuration used in the L0p state shown in FIG. 1A is retained in the L1 state shown in FIG. 1B after the link transitions from the L0p state to the L1 state has occurred in accordance with the current PCIe 6.0 specification. For this example, an RC 101 is communicating with an EP device 102 using a link configuration of eight active lanes 103. As indicated above, under the current PCIe 6.0 specification, when the link transitions to the L1 state, the eight lanes 103 that were being used to transfer data between the RC 101 and the EP 102 in the L0p state are retained in the L1 state in that voltage and clock signals continue to be provided to the eight lanes 103. In other words, in the L1 state, these eight lanes 103 are electrically active. Because these lanes 103 are not being used to communicate data, they are consuming less power in the L1 state than they had been in the L0p state, but they still consume some power due to voltage and clock signals continuing to be provided for these eight lanes 103 in the L1 state.

Figure 2A:
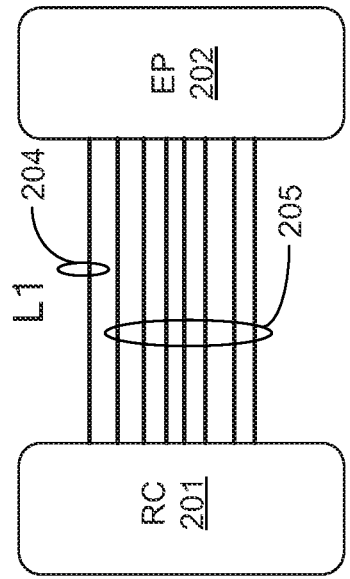
FIGS. 2A and 2B illustrate a block diagram of a PCIe 6.0 link in accordance with a representative embodiment of the present disclosure demonstrating an example of the manner in which a lane configuration used in the L0p state shown in FIG. 2A is altered in the L1 state shown in FIG. 2B to reduce power consumption after the link transitions from the L0p state to the L1 state.
Figure 2B:
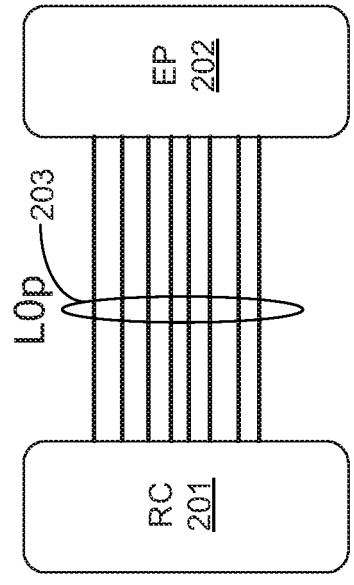

FIGS. 2A and 2B illustrate a block diagram of a PCIe 6.0 link in accordance with a representative embodiment of the present disclosure demonstrating an example of the manner in which a lane configuration used in the L0p state shown in FIG. 2A is altered in the L1 state shown in FIG. 2B after the link transitions from the L0p state to the L1 state. In accordance with a representative embodiment of the present disclosure, using the same example shown in FIGS. 1A and 1B of an RC communicating with an EP device using a link configuration of eight electrically-active lanes, when the link transitions to the L1 state from the L0p state, voltage and clock signals only continue to be provided to one lane 204 of the eight lanes 203 that were being used to transfer data between the RC 201 and the EP device 202 in the L0p state. The other seven lanes 205 of the eight lanes 203 are in electrically idle in that their respective phase lock loop (PLL) circuits have been turned off. Consequently, each of these seven lanes 205 consumes very little power and much less power than that consumed by each of the lanes 103 when the link was in the L1 state shown in FIG. 1B. Voltage and clock signals continue to be provided to the single lane 204 and its PLL circuit remains enabled to allow a message to be communicated between the RC 201 and the EP device 202 when it is time for the link to transition from the L1 state to some other power state, e.g., the L2 state, L0p state, etc.

Figure 3:
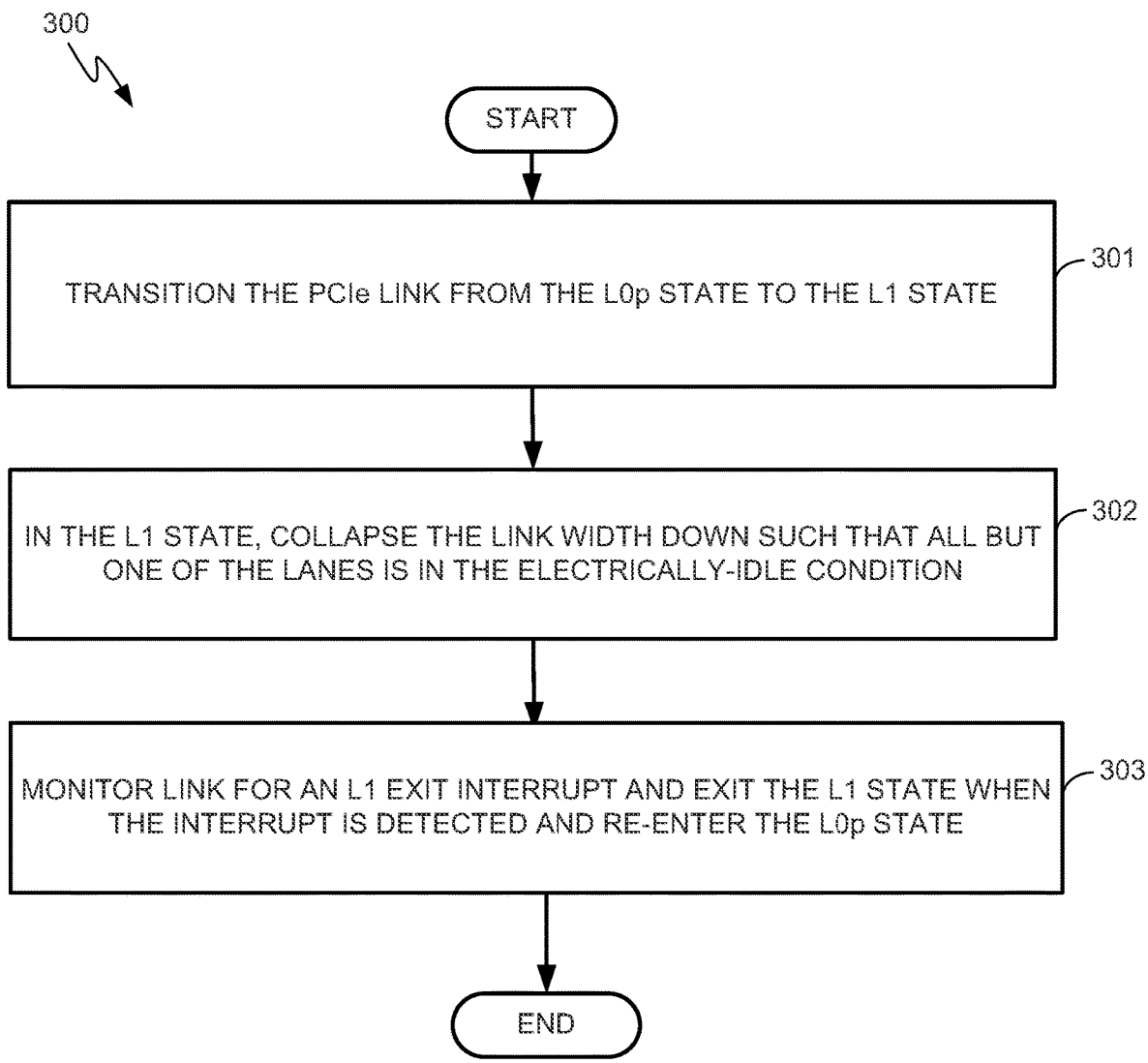
FIG. 3 is a flow diagram of the PCIe method in accordance with a representative embodiment for reducing power consumption in power-savings states (e.g., the L1 state).

FIG. 3 is a flow diagram of the PCIe method 300 in accordance with a representative embodiment for reducing power consumption in power-savings states (e.g., the L1 state). While the method will be described with reference to the L1 state and a transition from the L0p state to the L1 state, it should be noted that the inventive principles and concepts apply to transitioning from any active functional state to any power-saving state.

Block 301 represents the process of transitioning the PCIe link from the L0p state to the L1 state. Block 302 represents the process of collapsing the link width down to one electrically-active lane in the L1 state when the link transitions from the L0p state to the L1 state and placing all of the other lanes that were electrically active in the L0p state in an electrically-idle condition, or state, in which they consume very little power due to their PLL circuits being turned off. Block 303 represents the process of monitoring the single active lane for an L1 state exit interrupt indicating that the link is to transition back to the L0p state, and then exiting the L1 state and re-entering the L0p state when the interrupt occurs.

As indicated above, in accordance with the current PCIe 6.0 specification, if there is a change in configuration with respect to link speed and/or number of lanes when the link transitions from the L1 state back to the L0p state, the path of transition is:

L1 state→recovery state→L0p state→recovery state→configuration state→L0p. FIG. 4 illustrates a state diagram 400 for this path of transition. The entry into multiple recovery states when transitioning from the L1 state to the L0p state introduces additional latency in returning to the L0p state. The first recovery state following the L1 state is part of the link transition to the L0p state. After the link has transitioned to the L0p state, if configuration change is requested, the link transitions back to the second recovery state and then to the configuration state to enforce the new configuration.

In accordance with a representative embodiment of the present disclosure, the link configuration that was being used in the L0p state prior to transitioning to the L1 state is saved in a control register when the transition from the L0p state to the L1 state is initiated. The value in the control register is read when the transition from the L1 state back to the L0p state is initiated and compared to the value contained in a link status register. The link status register is an existing register that holds bit values corresponding to the current link speed and the current link width, among other bit values that are used to specify other link configuration settings. If the bit values contained in the control register match the bit values contained in the link status register for link speed and link width, the L0p state is resumed directly from the recovery state that follows the L1 state exit. FIG. 5 illustrates a state diagram 500 for this path transition: L1 state→recovery state→L0p state. The bit values in the link status register are reapplied during the recovery state as part of resuming the L0p state.

In accordance with this representative embodiment, if the bit values contained in the control register do not match the bit values contained in the link status register for link speed and link width, the link enters the configuration state after exiting the recovery state and then enters the L0p state and operates with the configuration identified by the bits contained in the link status register. FIG. 6 illustrates a state diagram 600 for this path transition:

L1 state→recovery state→configuration state→L0p state A comparison of FIGS. 4-6 demonstrates that the methods of the present disclosure achieve a great reduction in latency for transitions from the L1 state to the L0p state, even in cases where a link configuration change is requested for the next L0p state.

Figure 7:
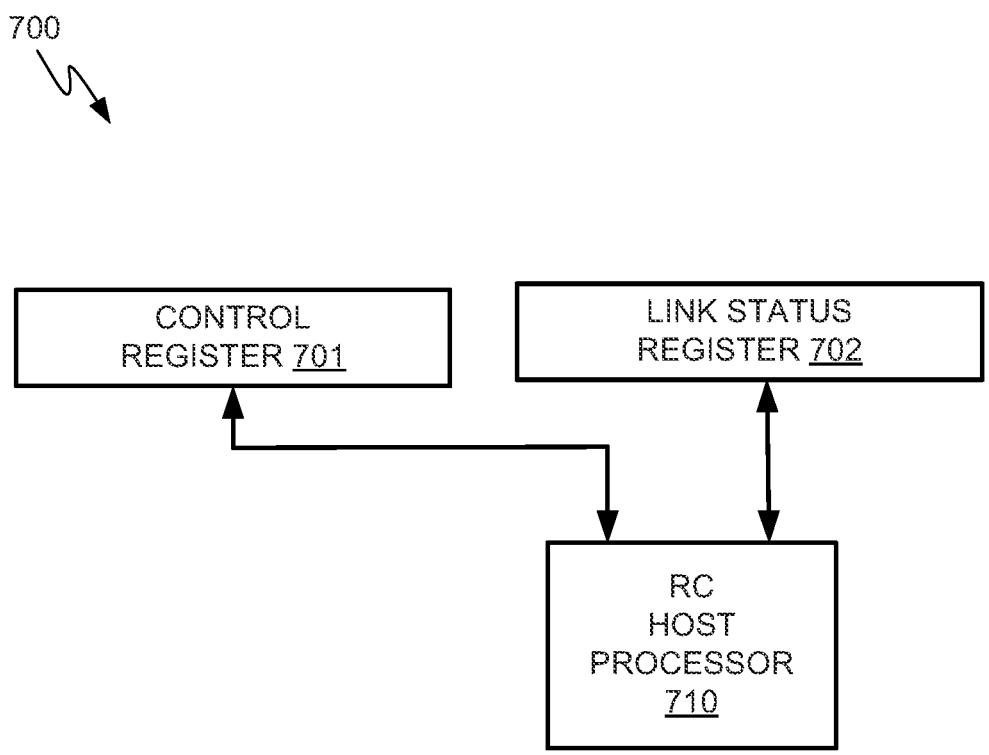
FIG. 7 illustrates a block diagram of the PCIe system in accordance with a representative embodiment of the present disclosure.

FIG. 7 illustrates a block diagram of the PCIe system 700 in accordance with a representative embodiment. The link configuration that was being used in the L0p state prior to transitioning to the L1 state is saved by the RC host processor 710 in a control register 701 when the transition from the L0p state to the L1 state is initiated. The bit values in the control register 701 and in the link status register 702 are read by the RC host processor 710 when the transition from the L1 state back to the L0p state is initiated and compared with one another. The registers 701 and 702 are typically components of the PCIe controller, which may also comprise the RC host processor 710.

If the bit values match, the link resumes the L0p state in its current configuration, with the current configuration settings being reapplied during the recovery state. The transition path is as shown in the state diagram 500 of FIG. 5: L1 state→recovery state→L0p state. If the bit values do not match, the link is reconfigured in accordance with the bit values for link speed and width contained in the link status register 702 and the transition path is as shown in the state diagram of FIG. 6: L1 state→recovery state→configuration state→L0p state.

Figure 8:
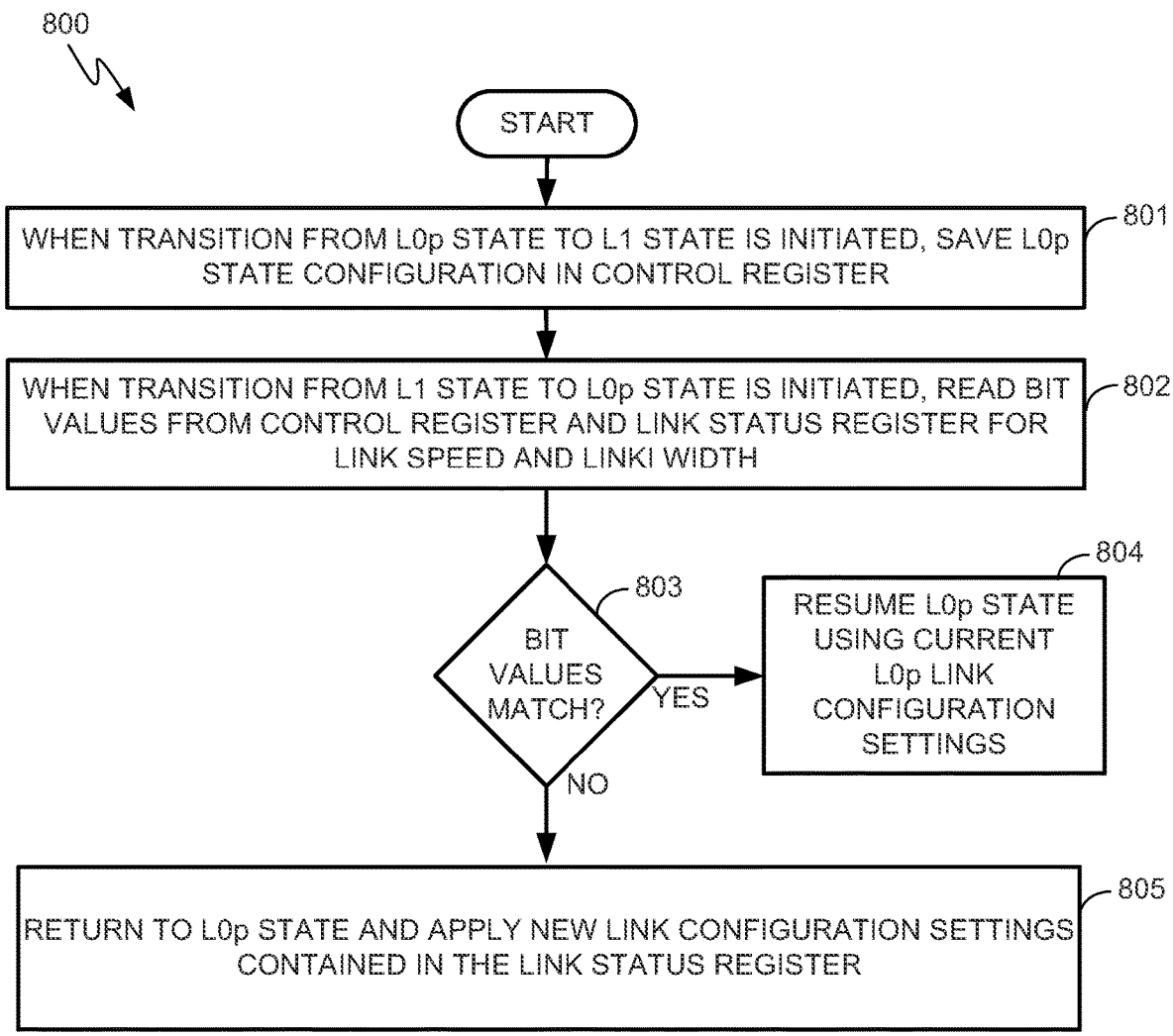
FIG. 8 is a flow diagram of the PCIe method performed by the system shown in FIG. 7 in accordance with a representative embodiment.

FIG. 8 is a flow diagram of the PCIe method 800 described above with reference to FIG. 7 in accordance with a representative embodiment. Block 801 represents saving the link configuration that was being used in the L0p state prior to transitioning to the L1 state in a control register when the transition from the L0p state to the L1 state is initiated. Block 802 represents the process of reading the bit values from the control register and from the link status register when the transition from the L1 state back to the L0p state is initiated. Block 803 represents the process of comparing the bit values read from the control register with the bit values read from the link status register to determine whether or not they match. If so, the link resumes the L0p state in its current configuration and the transition path is as shown in the state diagram 500 of FIG. 5: L1 state→recovery state→L0p state. Block 804 presents the process of resuming the L0p state using the current L0p link configuration settings, which is reapplied during the recover state of state diagram 500.

If the bit values do not match, the link is reconfigured in accordance with the bit values for link speed and width contained in the link status register and the transition path is as shown in the state diagram 600 of FIG. 6: L1 state→recovery state→configuration state→L0p state. Block 805 represents the process of returning to the L0p state and operating using the new link configuration settings.

Figure 9:
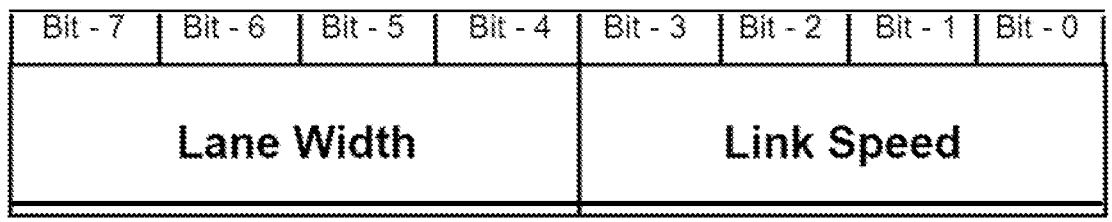
FIG. 9 is a block diagram of the control register shown in FIG. 7 in accordance with this representative embodiment.

FIG. 9 is a block diagram of the control register 701 shown in FIG. 7. In accordance with this representative embodiment, the control register 701 is an eight-bit register having four bits specifying link speed and four bits specifying link width. Bit 0-3 positions of the control register 701 specify link speed. When the bit 0-3 positions are 0001, respectively, the bit combination specifies a first link speed. When the bit 0-3 positions are 0010, respectively, the bit combination specifies a second link speed. When the bit 0-3 positions are 0011, respectively, the bit combination specifies a third link speed. When the bit 0-3 positions are 0100, respectively, the bit combination specifies a fourth link speed. When the bit 0-3 positions are 0101, respectively, the bit combination specifies a fifth link speed. When the bit 0-3 positions are 0110, respectively, the bit combination specifies a sixth link speed. When the bit 0-3 positions are 0111, respectively, the bit combination specifies a seventh link speed. When the bit 0-3 positions are 1000, respectively, the bit combination specifies an eighth link speed.

The bit 4-7 positions of the control register 701 specify link width. When the bit 4-7 positions are 0001, respectively, the bit combination specifies a one-lane link speed. When the bit 4-7 positions are 0010, respectively, the bit combination specifics a two-lane link. When the bit 4-7 positions are 0011, respectively, the bit combination specifies a three-lane link. When the bit 4-7 positions are 0100, respectively, the bit combination specifies a four-lane link. When the bit 4-7 positions are 0101, respectively, the bit combination specifies a five-lane link. When the bit 4-7 positions are 0110, respectively, the bit combination specifies a six-lane link. When the bit 4-7 positions are 0111, respectively, the bit combination specifies a seven-lane link. When the bit 4-7 positions are 1000, respectively, the bit combination specifies an eight-lane link.

Figure 10:
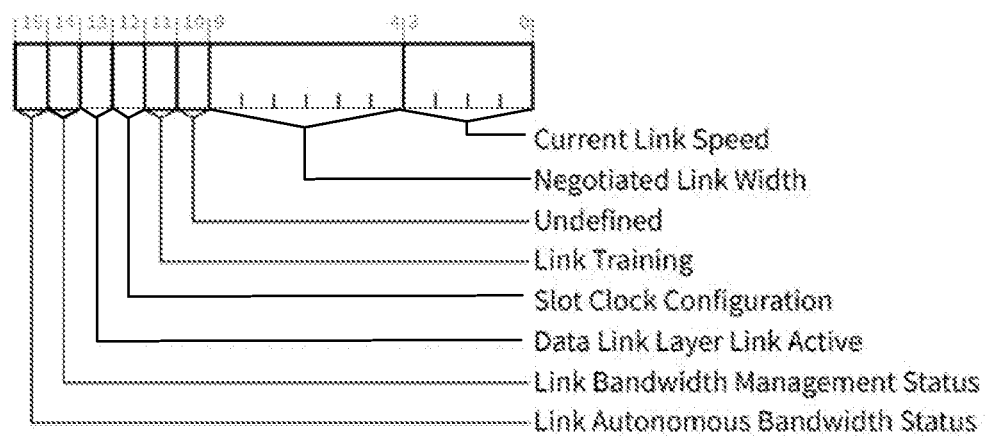
FIG. 10 is a block diagram of the known link status register shown in FIG. 7.

FIG. 10 is a block diagram of the link status register 702 shown in FIG. 7, which is an existing register used in PCIe 6.0 systems with bit positions allocated to specific purposes. The bit 0-3 positions of the register 702 specify the same link speeds as described above with reference to FIG. 9 for the control register 701. The bit 4-7 positions of the register 702 specify the same link widths as described above with reference to FIG. 9 for the control register 701. Thus, the comparison of bit values in bit positions 0-3 of the control register 701 with the bit values in bit positions 0-3 of the link status register 702 is an apples-to-apples comparison. Likewise, the comparison of bit values in bit positions 4-7 of the control register 701 with the bit values in bit positions 4-7 of the link status register 702 is an apples-to-apples comparison.

Figure 11:
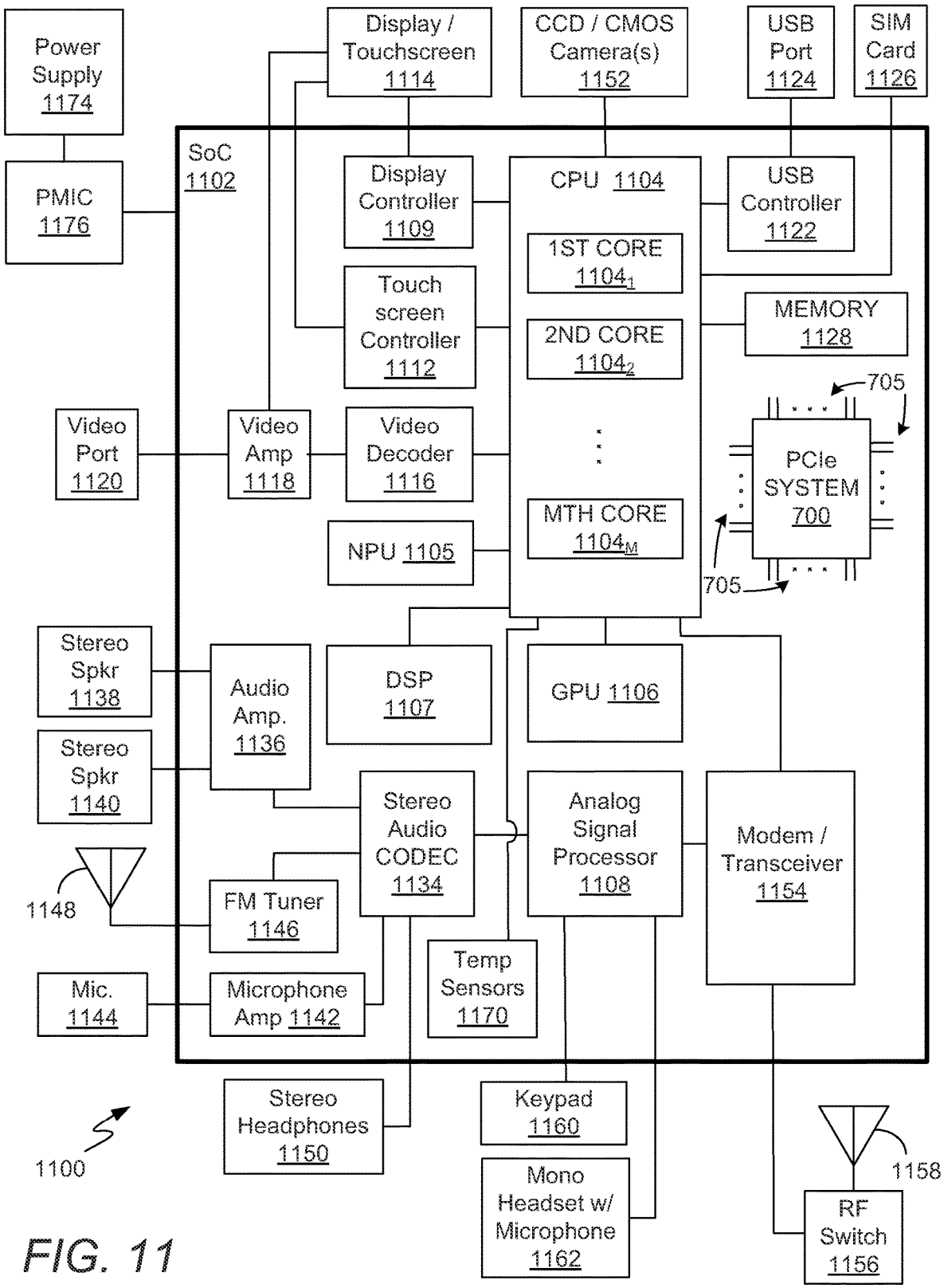
FIG. 11 illustrates an example of a PCD that can incorporate the systems and methods of the present disclosure.

FIG. 11 illustrates an example of a PCD 1100, such as a mobile phone, a smartphone, a portable game console such as an Extended Reality (XR) device, a Virtual Reality (VR) device, an Augmented Reality (AR) device, or a Mixed Reality (MR) device, etc., in which exemplary embodiments of systems, methods, computer-readable media, and other examples of the inventive principles and concepts of the present disclosure may be implemented. The PCD 1100 comprises an SoC 1102, which comprises a PCIe system as described herein, such as the PCIe system 700 shown in FIG. 7, for example. For purposes of clarity, some interconnects, signals, etc., are not shown in FIG. 11. For example, the connections of the components of the SoC 1102 to the PCIe bus 705 of the PCIe system 700 are not shown in FIG. 11.

The SoC 1102 may include a CPU 1104, an NPU 1105, a GPU 1106, a DSP 1107, an analog signal processor 1108, a modem/modem subsystem 1154, or other processors. The CPU 1104 may include one or more CPU cores, such as a first CPU core 11041, a second CPU core 11042, etc., through an $M^{th}$ CPU core 1104M.

A display controller 1109 and a touch-screen controller 1112 may be coupled to the CPU 1104. A touchscreen display 1114 external to the SoC 1102 may be coupled to the display controller 1110 and the touch-screen controller 1112. The PCD 1100 may further include a video decoder 1116 coupled to the CPU 1104. A video amplifier 1118 may be coupled to the video decoder 1116 and the touchscreen display 1114. A video port 1120 may be coupled to the video amplifier 1118. A universal serial bus ("USB") controller 1122 may also be coupled to CPU 1104, and a USB port 1124 may be coupled to the USB controller 1122. A subscriber identity module ("SIM") card 1126 may also be coupled to the CPU 1104.

One or more memories 1128 may be coupled to the CPU 1104. The one or more memories 1128 may include both volatile and non-volatile memories. Examples of volatile memories include static random access memory ("SRAM") and dynamic random access memory ("DRAM"). Such memories may be external to the SoC 1102 or internal to the SoC 1102. The one or more memories 1128 may include local cache memory or a system-level cache memory.

A stereo audio CODEC 1134 may be coupled to the analog signal processor 1108. Further, an audio amplifier 1136 may be coupled to the stereo audio CODEC 1134. First and second stereo speakers 1138 and 1140, respectively, may be coupled to the audio amplifier 1136. In addition, a microphone amplifier 1142 may be coupled to the stereo audio CODEC 1134, and a microphone 1144 may be coupled to the microphone amplifier 1142. A frequency modulation ("FM") radio tuner 1146 may be coupled to the stereo audio CODEC 1134. An FM antenna 1148 may be coupled to the FM radio tuner 1146. Further, stereo headphones 1150 may be coupled to the stereo audio CODEC 1134. Other devices that may be coupled to the CPU 1104 include one or more digital (e.g., CCD or CMOS) cameras 1152.

A modem or RF transceiver 1154 may be coupled to the analog signal processor 1108 and the CPU 1104. An RF switch 1156 may be coupled to the RF transceiver 1154 and an RF antenna 1158. In addition, a keypad 1160 and a mono headset with a microphone 1162 may be coupled to the analog signal processor 1108. The SoC 1102 may have one or more internal or on-chip thermal sensors 1170. A power supply 1174 and a PMIC 1176 may supply power to the SoC 1102.

Firmware or software may be stored in any of the above-described memories, or may be stored in a local memory directly accessible by the processor hardware on which the software or firmware executes. Execution of such firmware or software by the PCIs system 700 may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Figure 12:
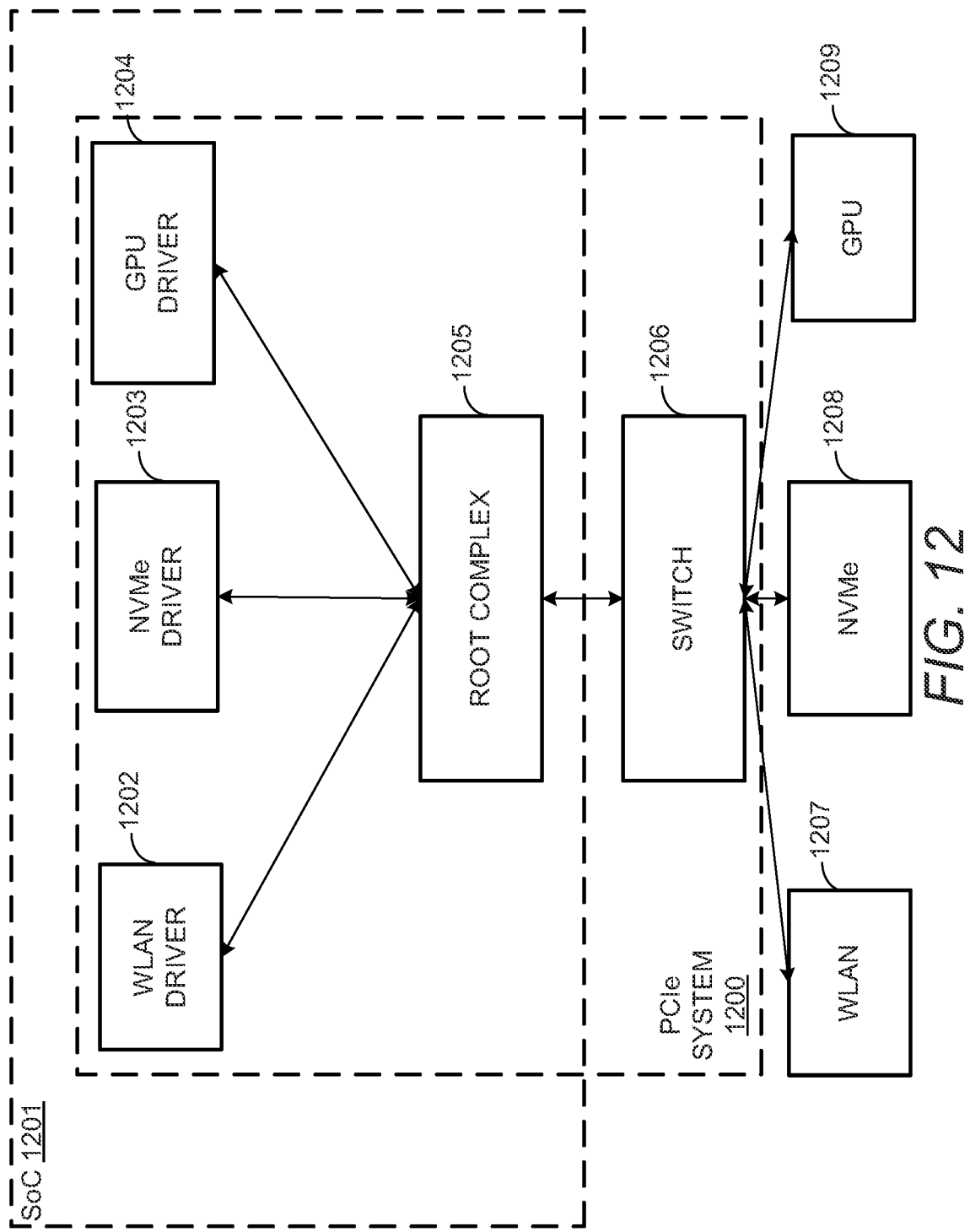
FIG. 12 illustrates a block diagram of the PCIe system in accordance with another exemplary embodiment.

FIG. 12 illustrates a block diagram of the PCIe system 1200 in accordance with another exemplary embodiment in which drivers 1202-1204 communicate with EP devices 1207-1209, respectively, via an RC 1205 and a switch 1206. In the exemplary embodiment shown in FIG. 12, the drivers 1202-1204 and the RC 1205 are components of an SoC 1201 and include a wireless local area network (WLAN) driver 1202, a nonvolatile memory express (NVMe) driver 1203 and a GPU driver 1204. When any of the drivers 1202-1204 initiate a PCIe packet transfer, the RC 1205, which typically comprises the host processor 710 (FIG. 7) of the PCIe system 1200, performs the processes represented by FIGS. 2A, 2B, 3 and 5-10 to cause FLIT packet transfers to be made between the WLAN driver 1202, the NVMe driver 1203, the GPU driver 1204, and the WLAN 127, the NVMe 1208 and the GPU 1209, respectively, while transitioning between active functional states and power-savings states.

Implementation examples are described in the following numbered clauses:

Implementation examples are described in the following numbered clauses:

1. A method for reducing at least one of power consumption and latency in a Peripheral Component Interconnect Express (PCIe) system, the method comprising:
   with a processor of the PCIe system, operating a PCIe link of the PCIe system in a first active functional state, the PCIe link having a first PCIe link configuration in the first active functional state in which N lanes of the PCIe link are electrically active and are used to communicate data between the processor and an end point (EP) device over the N lanes; and
   with the processor, causing the PCIe link to transition from the first active functional state to a first power-saving state, the PCIe link having a second PCIe link configuration in the first power-saving state in which M lanes of the N lanes are electrically active and P lanes of the N lanes are electrically idle, where M, N and P are positive integers and N>P>M.

2. The method of clause 1, wherein M=1 and N−M=P.

3. The method of any of clauses 1 or 2, wherein the PCIe system is a PCIe 6.0 system and wherein the first active functional state and the first power-saving state are a L0p state and an L1 state, respectively.

4. The method of any of clauses 1-3, further comprising:
   with the processor, prior to the processor causing the PCIe link to transition from the first active functional state to the first power-saving state, saving bit values specifying the first link configuration in a control register.

5. The method of any of clauses 1-4, further comprising:
   with the processor, causing the PCIe link to transition from the first power-saving state back to the first active functional state.

6. The method of clause 5, wherein causing the PCIe link to transition from the first power-saving state back to the first active functional state comprises:
   with the processor, causing the PCIe link to transition from the first power-saving state to a recovery state; and
   causing the PCIe link to transition from the recovery state to the first active functional state.

7. The method of any of clauses 5 and 6, wherein causing the PCIe link to transition from the first power-saving state back to the first active functional state comprises:
   with the processor, reading the bit values from the control register and reading bit values from a link status register;
   with the processor, comparing the bit values read from the control register with the bit values read from the link status register;
   with the processor, causing the PCIe link to transition from the first power-saving state to a recovery state; and
   with the processor, if the bit values read from the control register match the bit values read from the link status register, causing the PCIe link to transition from the recovery state to the first active functional state, wherein during the recovery state, the bit values read from the control register are reapplied to the PCIe link to return the PCIe link to the first link configuration.

8. The method of any of clauses 5 and 6, wherein causing the PCIe link to transition from the first power-saving state back to the first active functional state comprises:
   with the processor, reading the bit values from the control register and reading bit values from a link status register;
   with the processor, comparing the bit values read from the control register with the bit values read from the link status register;
   with the processor, causing the PCIe link to transition from the first power-saving state to a recovery state;
   with the processor, causing the PCIe link to transition from the recovery state to a configuration state if the bit values read from the control register do not match the bit values read from the link status register;
   with the processor, in the configuration state, reconfiguring the PCIe link to a third link configuration according to the bit values read from the link status register; and
   with the processor, causing the PCIe link to transition from the configuration state to the first active functional state after the PCIe link has been reconfigured to the third link configuration.

9. The method of any of clauses 5 and 6, wherein causing the PCIe link to transition from the first power-saving state back to the first active functional state comprises:
- with the processor, reading the bit values from the control register and reading bit values from a link status register;
- with the processor, comparing the bit values read from the control register with the bit values read from the link status register;
- with the processor, causing the PCIe link to transition from the first power-saving state to a recovery state;
- with the processor, if the bit values read from the control register match the bit values read from the link status register, causing the PCIe link to transition from the recovery state to the first active functional state, wherein during the recovery state, the bit values read from the control register are reapplied to the PCIe link to return the PCIe link to the first link configuration;
- with the processor, if the bit values read from the control register do not match the bit values read from the link status register, causing the PCIe link to transition from the recovery state to a configuration state, wherein during the configuration state, the PCIe link is reconfigured to a third link configuration according to the bit values read from the link status register; and
- with the processor, after the PCIe link has been reconfigured to the third link configuration, causing the PCIe link to transition from the configuration state to the first active functional state.

10. A Peripheral Component Interconnect Express (PCIe) system comprising:
- a PCIe bus comprising a plurality of lanes comprising a PCIe link; and
- a processor electrically coupled to the PCIe link, the processor comprising:
  - logic configured to operate the PCIe link in at least a first active functional state and in at least a first power-saving state, wherein the PCIe link has a first PCIe link configuration when the PCIe link is being operated in the first active functional state in which N lanes of the PCIe link are electrically active and used to communicate data between the processor and an end point (EP) device over the N lanes; and
  - logic configured to cause the PCIe link to transition from the first active functional state to the first power-saving state, the PCIe link having a second PCIe link configuration in the first power-saving state in which M lanes of the N lanes are electrically active and P lanes of the N lanes are electrically idle, where M, N and P are positive integers and N>P>M.

11. The PCIe system of clause 10, wherein M=1 and N−M=P.

12. The PCIe system of any of clauses 10 and 11, wherein the PCIe system is a PCIe 6.0 system and wherein the first active functional state and the first power-saving state are a L0p state and an L1 state, respectively.

13. The PCIe system of any of clauses 10-12, further comprising:
- a control register, and wherein the processor further comprises logic configured to cause bit values specifying the first link configuration to be saved in the control register prior to the processor causing the PCIe link to transition from the first active functional state to the first power-saving state.

14. The PCIe system of clauses 10-13, wherein the processor further comprises:
- logic configured to cause the PCIe link to transition from the first power-saving state back to the first active functional state.

15. The PCIe system of clause 14, wherein the logic configured to cause the PCIe link to transition from the first power-saving state back to the first active functional state comprises:
- logic configured to cause the PCIe link to transition from the first power-saving state to a recovery state; and
- logic configured to cause the PCIe link to transition from the recovery state to the first active functional state.

16. The PCIe system of any of clauses 14-15, wherein the logic configured to cause the PCIe link to transition from the first power-saving state back to the first active functional state comprises:
- logic configured to read the bit values from the control register and to read bit values from a link status register;
- logic configured to compare the bit values read from the control register with the bit values read from the link status register;
- logic configured to cause the PCIe link to transition from the first power-saving state to a recovery state if the bit values read from the control register match the bit values read from the link status register, wherein during the recovery state, the bit values read from the control register are reapplied to the PCIe link to return the PCIe link to the first link configuration; and
- logic configured to cause the PCIe link to transition from the recovery state to the first active functional state after the bit values read from the control register have been reapplied to the PCIe link to return the PCIe link to the first link configuration.

17. The PCIe system of any of clauses 14-15, wherein the logic configured to cause the PCIe link to transition from the first power-saving state back to the first active functional state comprises:
- logic configured to read the bit values from the control register and to read bit values from a link status register;
- logic configured to compare the bit values read from the control register with the bit values read from the link status register;
- logic configured to cause the PCIe link to transition from the first power-saving state to a recovery state;
- logic configured to cause the PCIe link to transition from the recovery state to a configuration state if the bit values read from the control register do not match the bit values read from the link status register;
- logic configured to reconfigure the PCIe link during the configuration state to a third link configuration according to the bit values read from the link status register; and
- logic configured to cause the PCIe link to transition from the configuration state to the first active functional state after the PCIe link has been reconfigured to the third link configuration.

18. The PCIe system of any of clauses 14-15, wherein the logic configured to cause the PCIe link to transition from the first power-saving state back to the first active functional state comprises:
- logic configured to read the bit values from the control register and to read bit values from a link status register;
- logic configured to compare the bit values read from the control register with the bit values read from the link status register;

logic configured to cause the PCIe link to transition from the first power-saving state to a recovery state;

logic configured to cause the PCIe link to transition from the recovery state to the first active functional state if the bit values read from the control register match the bit values read from the link status register, wherein during the recovery state, the bit values read from the control register are reapplied to the PCIe link to return the PCIe link to the first link configuration;

logic configured to cause the PCIe link to transition from the recovery state to a configuration state if the bit values read from the control register do not match the bit values read from the link status register, wherein during the configuration state, the PCIe link is reconfigured to a third link configuration according to the bit values read from the link status register; and logic configured to cause the PCIe link to transition from the configuration state to the first active functional state after the PCIe link has been reconfigured to the third link configuration.

19. A computer program comprising computer instructions for execution by a processor of a Peripheral Component Interconnect Express (PCIe) system, the computer program being embodied on a nontransitory computer-readable medium, the computer program comprising:

a first set of computer instructions for causing the processor to operate a PCIe link of the PCIe system in a first active functional state, the PCIe link having a first PCIe link configuration in the first active functional state in which N lanes of the PCIe link are electrically active and are used to communicate data between the processor and an end point (EP) device; and a second set of computer instructions for causing the processor to transition the PCIe link from the first active functional state to a first power-saving state, the PCIe link having a second PCIe link configuration in the first power-saving state in which M lanes of the N lanes are electrically active and P of the N lanes are electrically idle, where M. N and P are positive integers and N>P>M.

20. The computer program of clause 19, wherein M=1 and N−M=P.

21. The computer program of clause 19, wherein the PCIe system is a PCIe 6.0 system and wherein the first active functional state and the first power-saving state are a L0p state and an L1 state, respectively.

22. The computer program of any of clauses 19-21, wherein the computer program further comprises:

a third set of computer instructions for causing the PCIe link to transition from the first power-saving state back to the first active functional state.

23. The computer program of clause 22, wherein the third set of computer instructions causes the PCIe link to transition from the first power-saving state back to the first active functional state by:

causing the PCIe link to transition from the first power-saving state to a recovery state; and causing the PCIe link to transition from the recovery state to the first active functional state.

24. The computer program of any of clauses 22-23, further comprising:

a fourth set of computer instructions for causing bit values specifying the first link configuration to be saved in a control register of the PCIe system prior to the second set of computer instructions causing the PCIe link to transition from the first active functional state to the first power-saving state.

25. The computer program of clause 24, wherein the third set of computer instructions for causing the PCIe link to transition from the first power-saving state back to the first active functional state comprises:

a fifth set of computer instructions for reading the bit values from the control register and for reading read bit values from a link status register;

a sixth set of computer instructions for comparing the bit values read from the control register with the bit values read from the link status register;

a seventh set of computer instructions for causing the PCIe link to transition from the first power-saving state to a recovery state if the bit values read from the control register match the bit values read from the link status register, wherein during the recovery state, the bit values read from the control register are reapplied by the seventh set of computer instructions to the PCIe link to return the PCIe link to the first link configuration; and an eighth set of computer instructions for causing the PCIe link to transition from the recovery state to the first active functional state after the bit values read from the control register have been reapplied to the PCIe link to return the PCIe link to the first link configuration.

26. The computer program of clause 24, wherein the third set of computer instructions for causing the PCIe link to transition from the first power-saving state back to the first active functional state comprises:

a fifth set of computer instructions for reading the bit values from the control register and for reading bit values from a link status register;

a sixth set of computer instructions for comparing the bit values read from the control register with the bit values read from the link status register;

a seventh set of computer instructions for causing the PCIe link to transition from the first power-saving state to a recovery state;

an eighth set of computer instructions for causing the PCIe link to transition from the recovery state to a configuration state if the bit values read from the control register do not match the bit values read from the link status register;

a ninth set of computer instructions for reconfiguring the PCIe link during the configuration state to a third link configuration according to the bit values read from the link status register; and a tenth set of computer instructions for causing the PCIe link to transition from the configuration state to the first active functional state after the PCIe link has been reconfigured to the third link configuration.

27. The computer program of clause 24, wherein the third set of computer instructions for causing the PCIe link to transition from the first power-saving state back to the first active functional state comprises:

a fifth set of computer instructions for reading the bit values from the control register and for reading bit values from a link status register;

a sixth set of computer instructions for comparing the bit values read from the control register with the bit values read from the link status register;

a seventh set of computer instructions for causing the PCIe link to transition from the first power-saving state to a recovery state;

an eighth set of computer instructions for causing the PCIe link to transition from the recovery state to the first active functional state if the bit values read from the control register match the bit values read from the link status register, wherein during the recovery state, the eighth set of computer instructions causes the bit values read from the control register to be reapplied to the PCIe link to return the PCIe link to the first link configuration;

a ninth set of computer instructions for causing the PCIe link to transition from the recovery state to a configuration state if the bit values read from the control register do not match the bit values read from the link status register, wherein during the configuration state, the PCIe link is reconfigured by the ninth set of computer instructions to a third link configuration according to the bit values read from the link status register; and a tenth set of computer instructions for causing the PCIe link to transition from the configuration state to the first active functional state after the PCIe link has been reconfigured to the third link configuration.

28. A Peripheral Component Interconnect Express (PCIe) system comprising:

a PCIe bus comprising a plurality of lanes comprising a PCIe link;

means for operating the PCIe link in at least a first active functional state and in at least a first power-saving state, wherein the PCIe link having a first PCIe link configuration when the PCIe link is being operated in the first active functional state in which N lanes of the PCIe link are electrically active and used to communicate data between the processor and an end point (EP) device over the N lanes; and means for causing the PCIe link to transition from the first active functional state to the first power-saving state, the PCIe link having a second PCIe link configuration in the first power-saving state in which M lanes of the N lanes are electrically active and P lanes of the N lanes are electrically idle, where M, N and P are positive integers and N>P>M.

29. The PCIe system of clause 28, further comprising:

means for causing bit values specifying the first link configuration to be saved in the control register prior to the PCIe link being transitioned from the first active functional state to the first power-saving state.

30. The PCIe system of clause 29, wherein the means for causing the PCIe link to transition from the first power-saving state back to the first active functional state comprises:

means for read the bit values from the control register and for reading bit values from a link status register;

means for comparing the bit values read from the control register with the bit values read from the link status register;

means for causing the PCIe link to transition from the first power-saving state to a recovery state;

means for causing the bit values read from the control register to be reapplied to the PCIe link during the recovery state if the bit values read from the control register match the bit values read from the link status register to return the PCIe link to the first link configuration;

means for causing the PCIe link to transition from the recovery state to the first active functional state after the PCIe link has been returned to the first link configuration;

means for causing the PCIe link to transition from the recovery state to a configuration state if the bit values read from the control register do not match the bit values read from the link status register;

means for causing the PCIe link to be reconfigured to a third link configuration during the configuration state according to the bit values read from the link status register; and means for causing the PCIe link to transition from the configuration state to the first active functional state after the PCIe link has been reconfigured to the third link configuration.

Alternative embodiments will become apparent to one of ordinary skill in the art to which the invention pertains in view of the present disclosure. Therefore, although selected aspects have been illustrated and described in detail, it will be understood that various substitutions and alterations may be made therein.

What is claimed is:

1. A method for reducing at least one of power consumption and latency in a Peripheral Component Interconnect Express (PCIe) system, the method comprising:

with a processor of the PCIe system, operating a PCIe link of the PCIe system in a first active functional state, the PCIe link having a first PCIe link configuration in the first active functional state in which N lanes of the PCIe link are electrically active and are used to communicate data between the processor and an end point (EP) device over the N lanes;

with the processor, causing the PCIe link to transition from the first active functional state to a first power-saving state, the PCIe link having a second PCIe link configuration in the first power-saving state in which M lanes of the N lanes are electrically active and P lanes of the N lanes are electrically idle, where M, N and P are positive integers and N>P>M;

with the processor, prior to the processor causing the PCIe link to transition from the first active functional state to the first power-saving state, saving bit values specifying the first PCIe link configuration in a control register; and with the processor, causing the PCIe link to transition from the first power-saving state back to the first active functional state;

wherein causing the PCIe link to transition from the first power-saving state back to the first active functional state comprises:

with the processor, reading the bit values from the control register and reading bit values from a link status register;

with the processor, comparing the bit values read from the control register with the bit values read from the link status register.

2. The method of claim 1, wherein M=1 and N−M=P.

3. The method of claim 1, wherein the PCIe system is a PCIe 6.0 system and wherein the first active functional state and the first power-saving state are a L0p state and an L1 state, respectively.

4. The method of claim 1, wherein causing the PCIe link to transition from the first power-saving state back to the first active functional state comprises:

with the processor, causing the PCIe link to transition from the first power-saving state to a recovery state; and causing the PCIe link to transition from the recovery state to the first active functional state.

5. The method of claim 1, wherein causing the PCIe link to transition from the first power-saving state back to the first active functional state further comprises:

with the processor, causing the PCIe link to transition from the first power-saving state to a recovery state; and with the processor, if the bit values read from the control register match the bit values read from the link status register, causing the PCIe link to transition from the recovery state to the first active functional state, wherein during the recovery state, the bit values read from the control register are reapplied to the PCIe link to return the PCIe link to the first PCIe link configuration.

6. The method of claim 1, wherein causing the PCIe link to transition from the first power-saving state back to the first active functional state comprises:

with the processor, causing the PCIe link to transition from the first power-saving state to a recovery state;

with the processor, causing the PCIe link to transition from the recovery state to a configuration state if the bit values read from the control register do not match the bit values read from the link status register;

with the processor, in the configuration state, reconfiguring the PCIe link to a third link configuration according to the bit values read from the link status register; and with the processor, causing the PCIe link to transition from the configuration state to the first active functional state after the PCIe link has been reconfigured to the third link configuration.

7. The method of claim 1, wherein causing the PCIe link to transition from the first power-saving state back to the first active functional state comprises:

with the processor, causing the PCIe link to transition from the first power-saving state to a recovery state;

with the processor, if the bit values read from the control register match the bit values read from the link status register, causing the PCIe link to transition from the recovery state to the first active functional state, wherein during the recovery state, the bit values read from the control register are reapplied to the PCIe link to return the PCIe link to the first PCIe link configuration;

with the processor, if the bit values read from the control register do not match the bit values read from the link status register, causing the PCIe link to transition from the recovery state to a configuration state, wherein during the configuration state, the PCIe link is reconfigured to a third link configuration according to the bit values read from the link status register; and with the processor, after the PCIe link has been reconfigured to the third link configuration, causing the PCIe link to transition from the configuration state to the first active functional state.

8. A Peripheral Component Interconnect Express (PCIe) system comprising:

a PCIe bus comprising a plurality of lanes comprising a PCIe link; and a processor electrically coupled to the PCIe link, the processor comprising:

logic configured to operate the PCIe link in at least a first active functional state and in at least a first power-saving state, wherein the PCIe link has a first PCIe link configuration when the PCIe link is being operated in the first active functional state in which N lanes of the PCIe link are electrically active and used to communicate data between the processor and an end point (EP) device over the N lanes;

logic configured to cause the PCIe link to transition from the first active functional state to the first power-saving state, the PCIe link having a second PCIe link configuration in the first power-saving state in which M lanes of the N lanes are electrically active and Planes of the N lanes are electrically idle, where M, N and P are positive integers and N>P>M;

a control register, and wherein the processor further comprises logic configured to cause bit values specifying the first PCIe link configuration to be saved in the control register prior to the processor causing the PCIe link to transition from the first active functional state to the first power-saving state; and logic configured to cause the PCIe link to transition from the first power-saving state back to the first active functional state;

wherein the logic configured to cause the PCIe link to transition from the first power-saving state back to the first active functional state comprises:

logic configured to read the bit values from the control register and to read bit values from a link status register;

logic configured to compare the bit values read from the control register with the bit values read from the link status register.

9. The PCIe system of claim 8, wherein M=1 and N−M=P.

10. The PCIe system of claim 8, wherein the PCIe system is a PCIe 6.0 system and wherein the first active functional state and the first power-saving state are a L0p state and an L1 state, respectively.

11. The PCIe system of claim 8, wherein the logic configured to cause the PCIe link to transition from the first power-saving state back to the first active functional state comprises:

logic configured to cause the PCIe link to transition from the first power-saving state to a recovery state; and logic configured to cause the PCIe link to transition from the recovery state to the first active functional state.

12. The PCIe system of claim 8, wherein the logic configured to cause the PCIe link to transition from the first power-saving state back to the first active functional state further comprises:

logic configured to cause the PCIe link to transition from the first power-saving state to a recovery state if the bit values read from the control register match the bit values read from the link status register, wherein during the recovery state, the bit values read from the control register are reapplied to the PCIe link to return the PCIe link to the first PCIe link configuration; and logic configured to cause the PCIe link to transition from the recovery state to the first active functional state after the bit values read from the control register have been reapplied to the PCIe link to return the PCIe link to the first PCIe link configuration.

13. The PCIe system of claim 8, wherein the logic configured to cause the PCIe link to transition from the first power-saving state back to the first active functional state comprises:

logic configured to cause the PCIe link to transition from the first power-saving state to a recovery state;

logic configured to cause the PCIe link to transition from the recovery state to a configuration state if the bit values read from the control register do not match the bit values read from the link status register;

logic configured to reconfigure the PCIe link during the configuration state to a third link configuration according to the bit values read from the link status register; and logic configured to cause the PCIe link to transition from the configuration state to the first active functional state after the PCIe link has been reconfigured to the third link configuration.

14. The PCIe system of claim 8, wherein the logic configured to cause the PCIe link to transition from the first power-saving state back to the first active functional state comprises:
   logic configured to cause the PCIe link to transition from the first power-saving state to a recovery state;
   logic configured to cause the PCIe link to transition from the recovery state to the first active functional state if the bit values read from the control register match the bit values read from the link status register, wherein during the recovery state, the bit values read from the control register are reapplied to the PCIe link to return the PCIe link to the first link configuration;
   logic configured to cause the PCIe link to transition from the recovery state to a configuration state if the bit values read from the control register do not match the bit values read from the link status register, wherein during the configuration state, the PCIe link is reconfigured to a third link configuration according to the bit values read from the link status register; and
   logic configured to cause the PCIe link to transition from the configuration state to the first active functional state after the PCIe link has been reconfigured to the third link configuration.

15. A computer program comprising computer instructions for execution by a processor of a Peripheral Component Interconnect Express (PCIe) system, the computer program being embodied on a nontransitory computer-readable medium, the computer program comprising:
   a first set of computer instructions for causing the processor to operate a PCIe link of the PCIe system in a first active functional state, the PCIe link having a first PCIe link configuration in the first active functional state in which N lanes of the PCIe link are electrically active and are used to communicate data between the processor and an end point (EP) device; and
   a second set of computer instructions for causing the processor to transition the PCIe link from the first active functional state to a first power-saving state, the PCIe link having a second PCIe link configuration in the first power-saving state in which M lanes of the N lanes are electrically active and P of the N lanes are electrically idle, where M, N and P are positive integers and N>P>M;
   a third set of computer instructions for causing the PCIe link to transition from the first power-saving state back to the first active functional state;
   a fourth set of computer instructions for causing bit values specifying the first PCIe link configuration to be saved in a control register of the PCIe system prior to the second set of computer instructions causing the PCIe link to transition from the first active functional state to the first power-saving state;
   wherein the third set of computer instructions for causing the PCIe link to transition from the first power-saving state back to the first active functional state comprises:
      a fifth set of computer instructions for reading the bit values from the control register and for reading read bit values from a link status register:
      a sixth set of computer instructions for comparing the bit values read from the control register with the bit values read from the link status register.

16. The computer program of claim 15, wherein M=1 and N−M=P.

17. The computer program of claim 15, wherein the PCIe system is a PCIe 6.0 system and wherein the first active functional state and the first power-saving state are a L0p state and an L1 state, respectively.

18. The computer program of claim 15, wherein the third set of computer instructions causes the PCIe link to transition from the first power-saving state back to the first active functional state by:
   causing the PCIe link to transition from the first power-saving state to a recovery state; and
   causing the PCIe link to transition from the recovery state to the first active functional state.

19. The computer program of claim 15, wherein the third set of computer instructions for causing the PCIe link to transition from the first power-saving state back to the first active functional state further comprises:
   a seventh set of computer instructions for causing the PCIe link to transition from the first power-saving state to a recovery state if the bit values read from the control register match the bit values read from the link status register, wherein during the recovery state, the bit values read from the control register are reapplied by the seventh set of computer instructions to the PCIe link to return the PCIe link to the first PCIe link configuration; and
   an eighth set of computer instructions for causing the PCIe link to transition from the recovery state to the first active functional state after the bit values read from the control register have been reapplied to the PCIe link to return the PCIe link to the first PCIe link configuration.

20. The computer program of claim 15, wherein the third set of computer instructions for causing the PCIe link to transition from the first power-saving state back to the first active functional state comprises:
   a seventh set of computer instructions for causing the PCIe link to transition from the first power-saving state to a recovery state;
   an eighth set of computer instructions for causing the PCIe link to transition from the recovery state to a configuration state if the bit values read from the control register do not match the bit values read from the link status register;
   a ninth set of computer instructions for reconfiguring the PCIe link during the configuration state to a third link configuration according to the bit values read from the link status register; and
   a tenth set of computer instructions for causing the PCIe link to transition from the configuration state to the first active functional state after the PCIe link has been reconfigured to the third link configuration.

21. The computer program of claim 15, wherein the third set of computer instructions for causing the PCIe link to transition from the first power-saving state back to the first active functional state comprises:
   a seventh set of computer instructions for causing the PCIe link to transition from the first power-saving state to a recovery state;
   an eighth set of computer instructions for causing the PCIe link to transition from the recovery state to the first active functional state if the bit values read from the control register match the bit values read from the link status register, wherein during the recovery state, the eighth set of computer instructions causes the bit values read from the control register to be reapplied to the PCIe link to return the PCIe link to the first PCIe link configuration;

a ninth set of computer instructions for causing the PCIe link to transition from the recovery state to a configuration state if the bit values read from the control register do not match the bit values read from the link status register, wherein during the configuration state, the PCIe link is reconfigured by the ninth set of computer instructions to a third link configuration according to the bit values read from the link status register; and a tenth set of computer instructions for causing the PCIe link to transition from the configuration state to the first active functional state after the PCIe link has been reconfigured to the third link configuration.

22. A Peripheral Component Interconnect Express (PCIe) system comprising:

a PCIe bus comprising a plurality of lanes comprising a PCIe link;

means for operating the PCIe link in at least a first active functional state and in at least a first power-saving state, wherein the PCIe link having a first PCIe link configuration when the PCIe link is being operated in the first active functional state in which N lanes of the PCIe link are electrically active and used to communicate data between the processor and an end point (EP) device over the N lanes;

means for causing the PCIe link to transition from the first active functional state to the first power-saving state, the PCIe link having a second PCIe link configuration in the first power-saving state in which M lanes of the N lanes are electrically active and P lanes of the N lanes are electrically idle, where M, N and P are positive integers and N>P>M;

means for causing bit values specifying the first PCIe link configuration to be saved in the control register prior to the PCIe link being transitioned from the first active functional state to the first power-saving state; and means for causing the PCIe link to transition from the first power-saving state back to the first active functional state comprising:

means for reading the bit values from the control register and for reading bit values from a link status register; and means for comparing the bit values read from the control register with the bit values read from the link status register.

23. The PCIe system of claim 22, wherein the means for causing the PCIe link to transition from the first power-saving state back to the first active functional state further comprises:

means for causing the PCIe link to transition from the first power-saving state to a recovery state;

means for causing the bit values read from the control register to be reapplied to the PCIe link during the recovery state if the bit values read from the control register match the bit values read from the link status register to return the PCIe link to the first PCIe link configuration;

means for causing the PCIe link to transition from the recovery state to the first active functional state after the PCIe link has been returned to the first PCIe link configuration;

means for causing the PCIe link to transition from the recovery state to a configuration state if the bit values read from the control register do not match the bit values read from the link status register;

means for causing the PCIe link to be reconfigured to a third link configuration during the configuration state according to the bit values read from the link status register; and means for causing the PCIe link to transition from the configuration state to the first active functional state after the PCIe link has been reconfigured to the third link configuration.

\* \* \* \* \*